Aug. 1, 1967 R. E. PAUL 3,333,611
RADIAL ARM SAW
Filed Oct. 24, 1965

INVENTOR.
RALPH E. PAUL
BY Townsend and Townsend
ATTORNEYS

United States Patent Office 3,333,611
Patented Aug. 1, 1967

3,333,611
RADIAL ARM SAW
Ralph E. Paul, Red Bluff, Calif., assignor of fifty percent to Donald V. Smith, Red Bluff, Calif.
Filed Oct. 24, 1965, Ser. No. 504,726
7 Claims. (Cl. 143—6)

This invention relates to power operated cutting tools and, more particularly, to a radial arm saw assembly.

The present invention is directed to the automatic removal of sawdust from the region adjacent to and along the workpiece-positioning fence of a radial arm saw assembly. More particularly, the table top member of the assembly used to support a workpiece is provided with a series of spaced holes therethrough, with the holes being on one side of the fence. Thus, the sawdust resulting from the successive cutting of a number of workpieces will drop through the holes and thereby be removed from the supporting surface of the table top member. No substantial accumulation of the sawdust will occur and a large number of workpieces can be cut in a minimum of time without interruption.

In using a radial arm saw, a workpiece is held stationary against the fence and cut by drawing the saw through the workpiece rather than by moving the workpiece against the saw. Hence, it is necessary that the workpiece, throughout its length, be in face-to-face relationship with one side of the fence to be properly positioned with respect to the saw. Obviously, any sawdust disposed between the fence and a workpiece will cause the latter to be askew relative to the fence and thereby improperly positioned for cutting along a predetermined line. It is a characteristic feature of a radial arm saw that, after a workpiece has been cut, the resulting sawdust will, for the most part, accumulate along the fence although some sawdust will be scattered over the supporting surface and spaced from the fence.

The sawdust accumulation adjacent to the fence is due to the peculiar air currents generated in the working area when the saw blade is rotated at high speed. These air currents generally persist for a finite time in the vicinity of the fence even after the saw has been returned to its initial position and after the workpiece has been removed from the supporting surface. If the accumulation is large enough, another workpiece moved toward the fence prior to being cut will sweep the sawdust against the fence, preventing face-to-face contact of the workpiece with the fence. Manual methods, such as brushing or the use of pressurized air streams, have been utilized in the past to clear the sawdust but these, of course, require frequent interruptions on the part of the workman if a number of workpieces are to be cut.

This sawdust problem of a radial arm saw has been recognized for years but little has been done to circumvent it. One attempt at its solution is disclosed in U.S. Patent No. 3,104,687 wherein a radial arm saw assembly has its table top member spaced from the associated fence to define a recess for receiving sawdust. However, the recess is closed at the bottom, thus necessitating that it be periodically cleaned out; otherwise, a buildup of sawdust will eventually occur along the fence which will necessitate the use of the aforesaid manual removal methods. Moreover, the workpiece-supporting surface of this patent does not extend to the fence, thus rendering it unsuitable for use in cutting small workpieces, such as dowels of relatively small diameters.

The present invention overcomes the above problem by placing the aforesaid holes at locations sufficiently close to the fence such that sawdust moved toward the fence must pass over the holes and thereby into the same for gravitation therethrough. Hence, no substantial buildup of sawdust along the fence is possible at any time and a relatively large number of workpieces can be cut by the saw without frequent interruptions to clear away accumulated sawdust. Moreover, the holes are spaced apart by a sufficient amount so that the workpiece-supporting surface effectively extends completely to the fence. Thus, both small and large workpieces can be supported equally well adjacent to the fence.

The holes also function to provide downwardly directed air flow passages for some of the random air currents generated by the rotation of the saw blade. As these air currents pass through the holes, they forcibly convey or carry sawdust downwardly.

It is, therefore, the primary object of this invention to provide improvements in a radial arm saw assembly by incorporating automatic sawdust removal means therein so that time and effort ordinarily required to effect this sawdust removal step by conventional methods is rendered unnecessary and the cutting of a number of workpieces can be accomplished in a minimum of time.

Another important aim of the invention is to provide a table top member for use with a radial arm saw wherein the member is provided with a series of spaced holes therethrough along one side of the fence so that sawdust resulting from the cutting of a number of workpieces will fall into and through the holes to thereby insure that the table top member will be substantially free of sawdust at all times.

A further object of the present invention is the provision of sawdust removal means which is adapted for use with existing as well as with replacement table top members and which can be incorporated in such members merely by drilling the holes adjacent to the area occupied by the associated fence. Thus, the invention, by its extreme simplicity, may be incorporated with these members at negligible cost.

Other objects of this invention will become apparent as the following specification progresses, reference being had to the accompanying drawing wherein.

Figure 3:
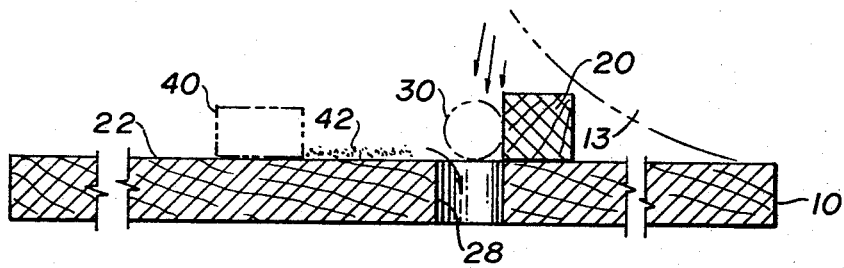
FIG. 3 is a vertical section through the table top member showing different positions and configurations of a workpiece prior to being cut.

The invention will be described with reference to the accompanying drawing wherein the improved table top member 10 is associated with a conventional radial arm saw assembly 12 and is adapted to support a workpiece to be cut by the rotatable saw blade 13 of the assembly. Assembly 12 includes a table 14 having legs 16, an upright post 26, an arm 24 extending radially from post 26, and a prime mover mechanism 18 shiftably mounted on arm 24 for movement longitudinally thereof and above the workpiece-supporting surface 22 of member 10. In general, member 10 and fence 20 are made of wood for the protection of blade 13.

Figure 2:
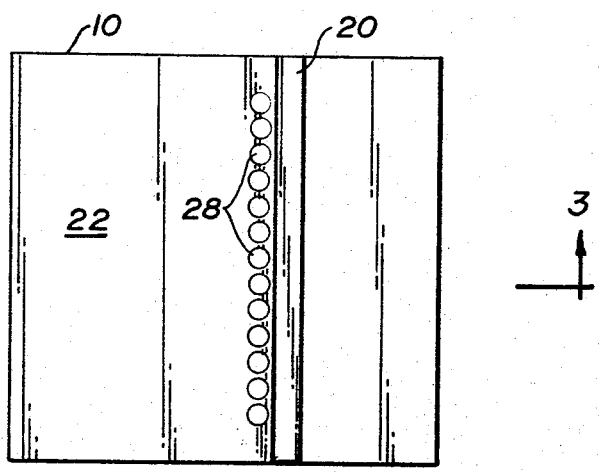
FIG. 2 is a top plan view of the table top member and the associated fence, illustrating one form of the sawdust removal holes.
Figure 1:
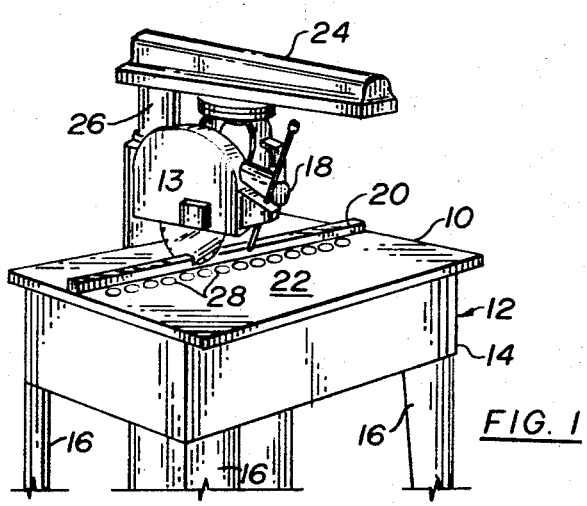
FIG. 1 is a perspective view of a radial arm saw assembly having the improved table top member thereon.

The present invention resides in the provision of spaced holes 28 through member 10, holes 28 being in substantial alignment with each other (FIG. 2) and disposed adjacent to one side of fence 20, namely the side which is to be engaged by a workpiece to be cut. Holes 28 may be of any configuration and one form is illustrated as being cylindrical in FIGS. 1–3. Since the holes are spaced apart, surface 22 effectively extends to fence 20 so that, regardless of the size of a workpiece, the latter may be properly supported on member 10 alongside fence 20. This is illustrated in FIG. 3 wherein a transversely circular workpiece 30 has a diameter less than the diameter of holes 28. Nonetheless, workpiece 30 is capable of being supported while being in engagement with the adjacent side of fence 20.

Figure 5:
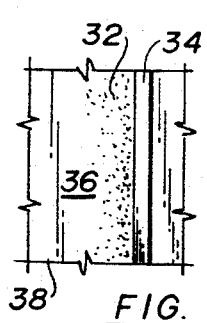
FIG. 5 is a fragmentary, top plan view of a table top member showing an accumulation of sawdust thereon adjacent to and along the associated fence.

As a number of workpieces are cut by saw 13, sawdust accumulates along fence 20 due to the air currents generated in this vicinity by the rotation of saw 13 at high speed. FIG. 5 illustrates how sawdust normally collects along a fence and on a table top member of conventional construction, i.e., one having an imperforate supporting surface. In this view, most of the sawdust accumulation 32 is concentrated on the supporting surface 36 of conventional table top member 38 directly adjacent to the associated fence 34. Some sawdust is disposed outwardly from the fence in a layer or film on surface 36.

In the present invention, holes 28 are positioned at locations which correspond to the region of greatest sawdust accumulation on conventional table top members. Moreover, holes 28 are positioned to receive sawdust initially scattered over the suporting surface and subsequently swept toward the fence and over holes 28 as a workpiece to be cut is moved over surface 22 toward fence 20. Holes 28 thus receive and direct the sawdust downwardly so as to be automatically removed from surface 22. This surface will therefore be clean and in a condition for properly supporting another workpiece to be subsequently cut.

Some of the aforesaid air currents assist in removing the sawdust from surface 22 by passing through certain of the holes 28 and carrying sawdust therewith. These air currents, although they are circular in nature, are generally directed downwardly and persist for a finite length of time in the vicinity of fence 20 even after the separated sections of a workpiece have been removed and after saw blade 13 has been returned to its starting position on the opposite side of fence 20.

The film of sawdust remaining on surface 22 following the cutting of a workpiece is swept toward and into holes 28 in the manner illustrated in FIG. 3. In this view, a workpiece 40 is initially placed on surface 22 in spaced relationship to fence 20 and moved toward the latter prior to being cut. The sawdust accumulated in advance of the workpiece is effectively swept toward, over and into holes 28, thus preventing a buildup of this sawdust accumulation along fence 20.

Figure 4:
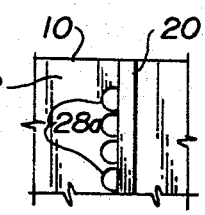
FIG. 4 is a fragmentary top plan view of the table top member showing another form of the holes.

FIG. 4 illustrates that the sawdust removal holes may have configurations other than the cylindrical configuration shown in FIG. 3. Holes 28a in this view are semi-cylindrical with the greatest diameter portion of each hole 28a being adjacent to fence.

It is clear that the sawdust removal holes in this invention may be incorporated in existing and replacement table top members merely by drilling the latter at the appropriate locations. Thus, no substantial expenditure of time and effort is required to provide assembly 12 with the advantageous features of the invention and the unit cost of the assembly and the cost of table top replacements therefor are held to a minimum. Holes 28 are capable also of receiving particulate material other than sawdust, such as dust, dirt and the like. It is to be emphasized here that the term "sawdust" used herein includes particulate material formed by the cutting of a workpiece regardless of the material forming the workpiece.

While several embodiments of the present invention have been shown and described it will be obvious that other adaptations and modifications may be made without departing from the true spirit and scope of the invention.

What is claimed is:

1. In a cutting tool assembly having a fence, the combination with said fence of: structure defining a supporting surface adapted to support a workpiece to be cut, said fence being coupled to said structure and disposed to place a workpiece supported on the surface in a cutting position after the workpiece has been moved against the fence, said surface extending to the fence, said structure having means adjacent to said fence and extending downwardly from said surface for removing sawdust formed from the cutting of a workpiece from said surface to thereby prevent an accumulation of sawdust on said surface.

2. In a radial arm saw assembly: a table top member having an upper surface adapted to support a workpiece to be cut; and a fence mounted on said member and disposed to place a workpiece supported on said surface in a cutting position when the workpiece engages one side of the fence, said member having a number of spaced holes extending therethrough adjacent to said one side of the fence, the spacing of the holes being sufficient to permit substantially all of the sawdust formed from the cutting of a workpiece to gravitate into and through said holes and to permit workpieces of substantially all sizes and shapes to be properly adjacent to said fence.

3. In a radial arm saw assembly as set forth in claim 2, wherein said holes are in alignment longitudinally of said fence.

4. In a radial arm saw assembly as set forth in claim 3, wherein each hole is cylindrical.

5. In a radial arm saw assembly as set forth in claim 3, wherein each hole is semi-cylindrical with the greatest diameter portion of the hole being in relatively close proximity to the fence.

6. In combination: a radial arm saw unit including a radial arm saw, a table top member having an upper surface for supporting a workpiece to be cut by said saw, a fence coupled to said member and extending upwardly from said upper surface to dispose said workpiece in a cutting position after the workpiece has been moved against one side of the fence, said upper surface extending to said fence, and structure on said member defining a number of spaced holes therethrough adjacent to said one side of the fence, the spacing of the holes being sufficient to permit substantially all of the sawdust formed from the cutting of a workpiece to gravitate into and through the holes and to permit workpieces of substantially all sizes and shapes to be properly supported adjacent to said fence.

7. The combination as set forth in claim 6, wherein said holes are arcuate in cross-section.

References Cited

UNITED STATES PATENTS

| | | | |
|---|---|---|---|
| 2,558,217 | 6/1951 | Ness et al. | 143—6 |
| 2,590,119 | 3/1952 | Osternus | 143—6 |
| 2,595,483 | 5/1952 | Peiter | 144—252 X |
| 3,104,687 | 9/1963 | Field | 143—6 |

WILLIAM W. DYER, Jr., *Primary Examiner.*

W. D. BRAY, *Assistant Examiner.*